June 26, 1962  F. J. HOHL  3,040,872
CONVEYOR

Filed July 13, 1959  3 Sheets-Sheet 1

INVENTOR
FRANK J. HOHL
ATTORNEY
BY: Bean, Brooks Buckley & Bean.

June 26, 1962  F. J. HOHL  3,040,872
CONVEYOR
Filed July 13, 1959  3 Sheets-Sheet 2
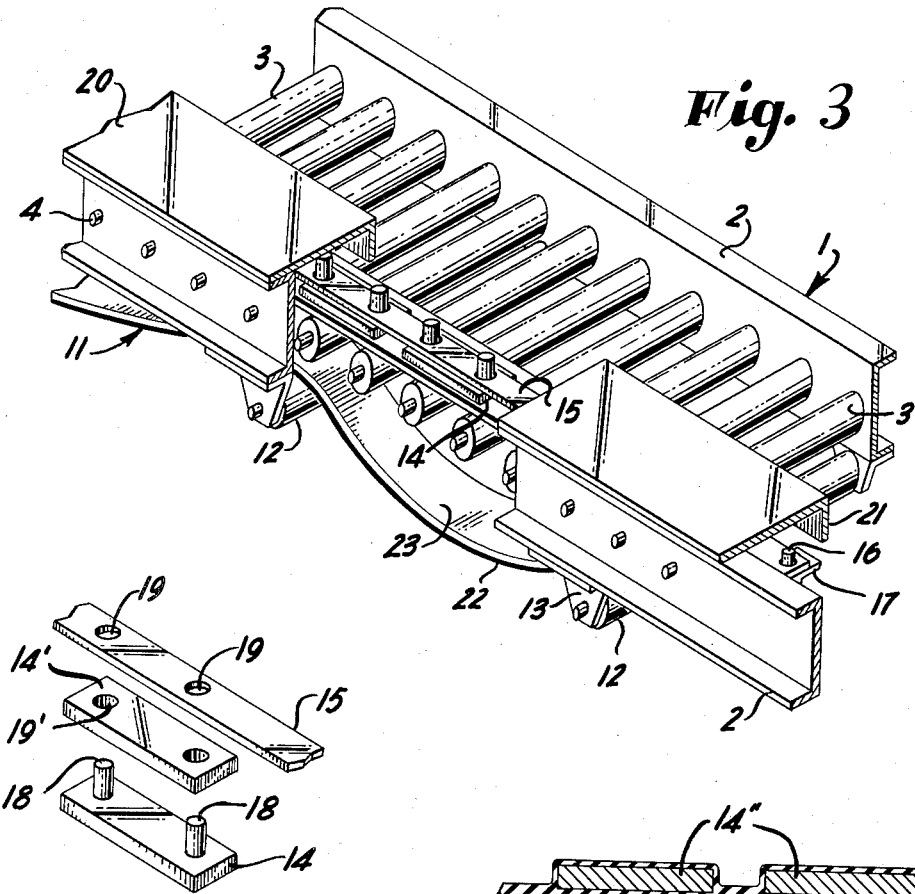
Fig. 3
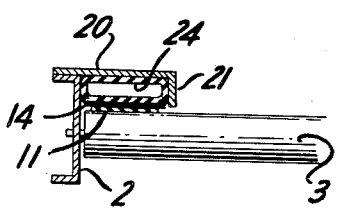
Fig. 4
Fig. 7
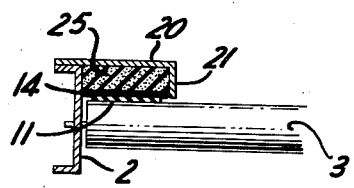
Fig. 8  Fig. 9
INVENTOR
FRANK J. HOHL
ATTORNEY
BY: Beau, Brooks Buckley & Beau.

June 26, 1962  F. J. HOHL  3,040,872
CONVEYOR

Filed July 13, 1959   3 Sheets-Sheet 3

INVENTOR
FRANK J. HOHL

ATTORNEY
BY: Bean, Brooks Buckley & Bean.

United States Patent Office 3,040,872
Patented June 26, 1962

3,040,872
CONVEYOR
Frank J. Hohl, Buffalo, N.Y., assignor to Hohl Machine
& Conveyor Co., Inc., Buffalo, N.Y.
Filed July 13, 1959, Ser. No. 826,635
16 Claims. (Cl. 198—127)

This invention relates generally to the conveyor art, and more specifically to a new and useful conveyor of the live roller type.

Whereas, in conventional conveyors of the live roller type the rollers are driven by a belt held in frictional engagement with the under surfaces thereof, the live roller conveyor of my invention utilizes superposed drive means engaging the upper surfaces of the rollers adjacent one end thereof, it being a primary object of my invention to provide a live roller conveyor of this general construction with a relatively inexpensive and simple drive arrangement which is readily installed, easily maintained, durable and dependable in operation, and which can be adjusted readily to selectively vary the driving force imparted to the rollers.

In one aspect thereof, a conveyor constructed in accord with my invention is characterized by the provision of a series of rollers, with a first drive part comprising multiple individual weights in superposed relation to the rollers adjacent one end thereof, the weights spanning no more than two of the rollers, a second drive part comprising friction means interposed between the weights and the rollers and bearing against the latter, and means for moving at least one of the drive parts lengthwise of the series of rollers for rotating the same.

In another aspect thereof, a conveyor constructed in accord with my invention is characterized by the provision of a series of live rollers journaled on a supporting frame, an endless drive member frictionally engaging the upper surfaces of the rollers adjacent one end thereof for rotating the same, and plural individual weight members superposed on the endless drive member and pressing the latter against the rollers to increase the frictional engagement of the drive member with the rollers.

The foregoing and other objects, advantages, and characterizing features of a conveyor constructed in accord with my invention will become readily apparent from the ensuing detailed description of certain illustrative forms thereof, considered in conjunction with the accompanying drawing wherein like reference numerals denote like parts throughout the various views and wherein:

FIG. 3 is a fragmentary perspective view thereof, parts being broken away to show details;

FIG. 4 is a fragmentary, exploded perspective view of a detail thereof;

FIG. 7 is a fragmentary sectional view of a modified drive belt construction;

FIGS. 8 and 9 are fragmentary transverse sectional views illustrating other drive arrangements;

Figure 1:
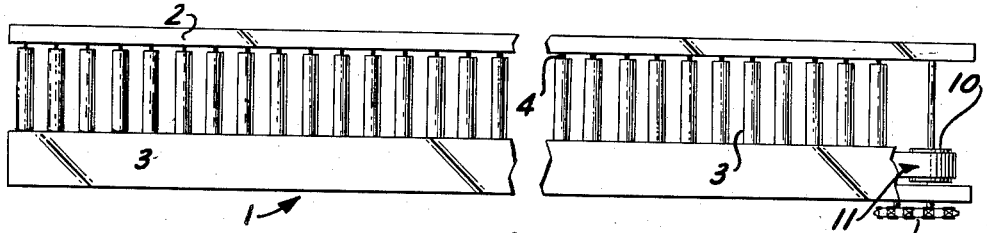
FIG. 1 is a top plan view of one form of conveyor constructed in accord with my invention, parts being broken away for ease of illustration and to show details.
Figure 2:
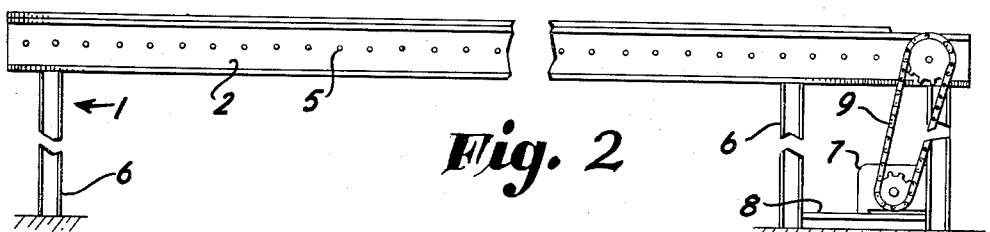
FIG. 2 is a side elevational view thereof.

Referring now in detail to the illustrative embodiments depicted in the accompanying drawing, FIGS. 1 and 2 illustrate the general arrangement of a straight line conveyor of my invention, comprising a supporting frame, generally designated 1, having opposite side rails 2 of generally channel shaped cross section in which a series of rollers 3, are journaled, the rollers being carried on stub shafts 4 extending through openings 5 in the side rails 2. It will be appreciated that the rollers 3 are provided with conventional ball bearing or like supports, the details of which are not essential to my invention and therefore are not illustrated although I desire that the rollers be journaled with a minimum of friction.

The side rails 2 are in turn supported by legs 6, and a drive motor 7 is carried on a base 8, having a chain drive 9 to a drive pulley 10, also journaled on the frame side rails 2.

In accord with my invention, the rollers 3 are rotated by drive means which comprise, in the embodiments of FIGS. 1 through 9, an endless drive belt, generally designated 11, which is trained around drive pulley 10, and an idler pulley (not illustrated) adjacent the opposite end of the conveyor. Belt 11 is supported on its return, idling flight by pulleys or rollers 12 journaled in brackets 13 secured to the frame side rails 2.

Drive belt 11 extends along the upper surfaces of one end only of the rollers 3, as clearly illustrated in FIGS. 1 and 3, and presents to the rollers a friction surface having a relatively high coefficient of friction. Therefore, when the endless belt 11 is moved by motor 7, it rotates the rollers 3.

To increase the frictional engagement of drive belt 11 with rollers 3, and thereby enable the rollers to convey much heavier loads, I provide means in the form of individual weight members 14 which are superposed on belt 11 so as to force the belt against the rollers. This gravity induced force increases the friction between belt 11 and rollers 3, with the result that the belt 11 will cause rollers 3 to advance a much heavier load than would be possible without the weight members 14.

The weight members 14 are so dimensioned, lengthwise of the drive belt 11, as not to exceed twice the center line spacing between adjacent rollers, with the result that each individual weight member 14 can span no more than two of the rollers 3 at any time. This is important, because it insures that the weight members will have driving contact with the rollers therebelow, as contrasted with the situation which might prevail if a weight member could span three rollers, and be supported by rollers adjacent its opposite ends at an elevation above an intermediate roller. Only a slight elevation of the weight from such intermediate roller would suffice to substantially eliminate the driving force or friction between the belt 11 and the roller.

In addition, while it is possible simply to place the weight members 14 upon belt 11, in end to end abutting contact, if that is done the weight members have a tendency to pile up and cause one another to buckle, which relieves the driving friction against certain of the rollers with resulting loss in transport power of such roller. To avoid this, I prefer that means be provided to restrain the weight members 14 against movement lengthwise of the conveyor. Such means can comprise an elongated tie member 15, in the form of a flexible strap which extends lengthwise of the conveyor and spans the weight members 14, and which need be anchored only at the beginning of the drive flight of belt 11, as by a pin 16 carried by a bracket 17 (FIG. 3). Pins 18, carried by weight members 14, project through openings 19 in the strap 15, simply slip-fitting therethrough, whereby the weight members 14 are held by strap 15 against movement with the belt 11, although they are permitted some up and down movement generally radially of the rollers 3, to accommodate variations in the height of the rollers when the conveyor is in motion. To restrain the weight members against lateral motion, as well as endwise motion, I provide two such pins 18 on each weight, each pin projecting through an opening 19 in the strap 15, and to further facilitate the vertical adjustment of the weight members to the contour of the rollers, as a load is conveyed, I prefer that the member 15 be formed of a flexible strap-like material possessing substantial lateral rigidity, while enabling flexing in a generally vertical plane, toward and away from the plane containing the axes of rotation of rollers 3.

Accordingly, with this arrangement the drive belt is held against the rollers in frictional engagement therewith, to impart a considerable driving force thereto, in an arrangement which is readily assembled by simply slip-fitting the weight members 14 and strap 15 together and to the supporting frame 1. Also, this facilitates adjustment of the driving force, either by substituting members of different weight for the members 14, or by adding additional weight members 14' (FIG. 4) having openings 19' to receive the pins 18 therethrough. Because of the slip-fit assembly of the weight members and their restraining strap it will be appreciated that the conveyor drive is quickly and conveniently adjusted to accommodate different types of loads. The drive parts, comprising the drive belt on the one hand and the supported weights on the other, can be substantially enclosed by an angle member having a top wall 20 secured to the side rail 2 adjacent the drive assembly, with a depending flange 21 substantially completing the enclosure. It will be appreciated that the angle 20, 21 can be simply bolted to the side rail, for convenient removal as desired, or the side rail 2 and angle 20, 21 can be so spaced above the drive belt 11 as to permit reaching under the wall 20 to make the desired adjustments in the weight members.

It will be seen that the drive mechanism of this arrangement utilizes realtive friction, the rollers being journaled by means having a very low coefficient of friction relative to the coefficient of friction between the drive belt 11 and the surface of roller 3 in contact therewith. The use of bearings to support the rollers 3 minimizes the friction in the roller support. The drive force thus imparted is reduced by the friction between the belt and the weight, and to minimize this factor the bottom surfaces of the weights can be coated with any suitable material providing an anti-friction surface, such as for example the synthetic plastic material sold under the trademark "Mylar." Alternately, or in addition thereto, the drive belt 11 can be constructed to present a smooth surface presented to the weight members 14, and a friction surface to the rollers 3. Such a belt is illustrated in FIG. 3 of the drawing, comprising a belt having an anti-friction side 22 of "Mylar" or other suitable material with a friction side 23 of rubber, or the like, having a relatively high coefficient of friction as contrasted to the side 22.

Instead of restraining weight members 14 against movement with drive belt 11, they can be fastened to the drive belt, or even molded therein, as illustrated in FIG. 7, wherein the weight members 14" are shown encased in the material of a drive belt 11'. In such an arrangement, friction between belt and weights is eliminated.

Also, in addition to adding or subtracting the number of weight members, thereby to vary the driving force, the weight members can be backed up by adjustable means, such as springs or the like (not illustrated) or means such as an inflatable bag 24 (FIG. 8) which can be inflated and deflated as desired to vary the backing force against the weights and thereby vary the total driving force imparted to belt 11. Alternately, as illustrated in FIG. 9 a backing of resilient solid material, such as sponge rubber, illustrated at 25, could be provided, with means for interchanging blocks 25 of one material for blocks 25 of another. In either case, the end result is to vary the drive force imparted to the rollers, to accommodate different loads being conveyed thereby.

Figure 5:
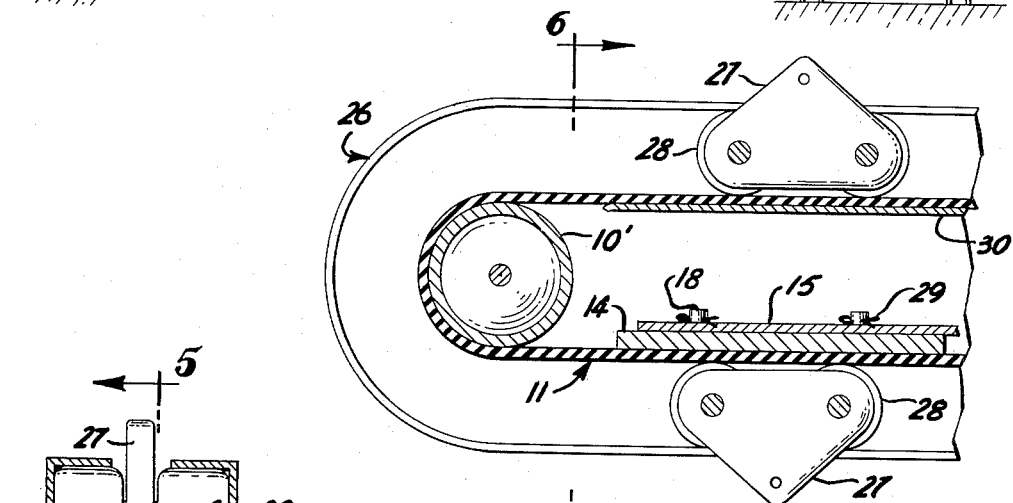
FIG. 5 is a longitudinal sectional view through a modified construction of my invention, being taken about on line V—V of FIG. 6.
Figure 6:
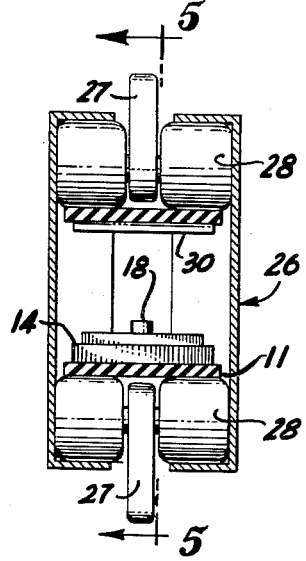
FIG. 6 is a transverse sectional view thereof taken about on line VI—VI of FIG. 5.

It will be appreciated that the conveyor drive of my invention can be applied to multiple tiered conveyors, to drive one set of conveyor rollers on one flight and another set on the return flight. In addition, the drive of my invention is applicable to a storage type of conveyor, such as illustrated in FIGS. 5 and 6, wherein a housing 26 formed of mating wall sections provides a track for trolleys 27 having wheels 28, the drive belt 11 extending over a drive pulley 10' with the weight members 14 being restrained by means of a strap 15 and pins 18, with retainer pins 29, such as a cotter pin, through the upright pins 18 on the side of strap 15 opposite weight 14, so that when the trolley 27 passes from beneath drive belt 11 the weight member 14 will not fall as the drive belt yields but will be held assembled to the strap 15. A bed plate 30 is provided to support the upper flight of drive bent 11 and it will be seen that the drive belt 11 engages the rollers 28 to impart rotation thereto and thereby move hte trolleys 27 along housing 26 in the same manner as the drive belt 11 rotates the rollers 3 in the embodiment of FIGS. 1–3.

Figure 10:
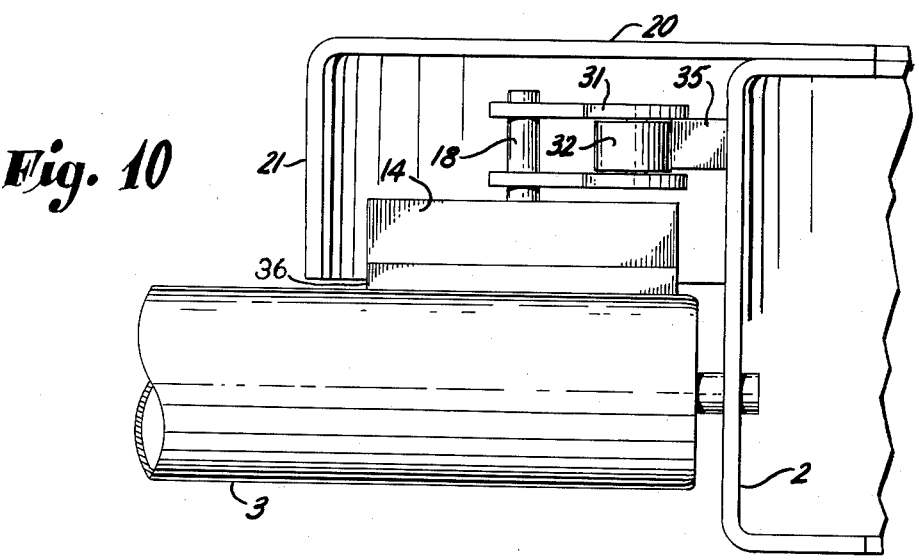
FIG. 10 is a fragmentary, transverse sectional view of still another drive arrangement, particularly adapted for use on curved conveyors.
Figure 11:
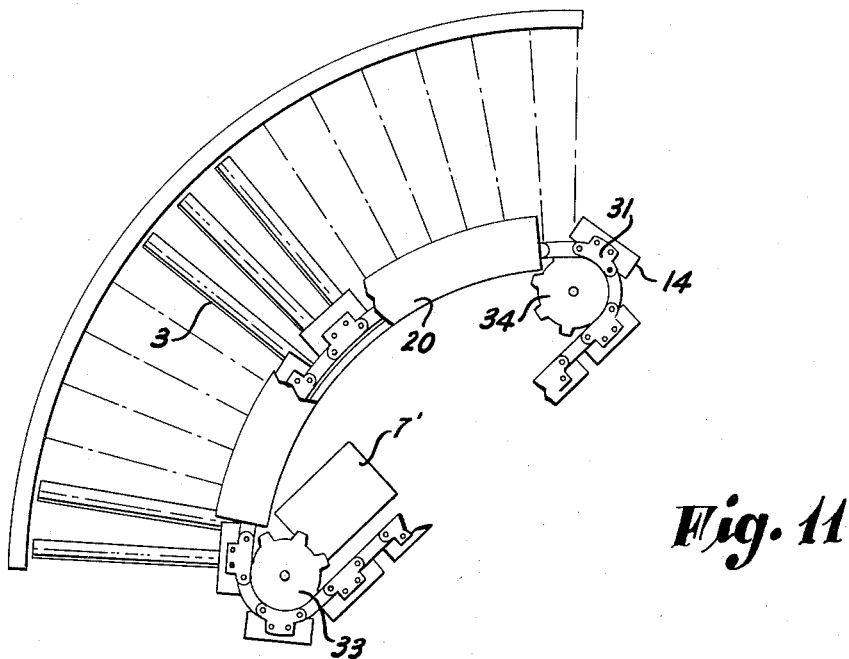
FIG. 11 is a top plan view thereof.

For curved conveyors, the drive of my invention is conveniently modified as illustrated in FIGS. 10 and 11, comprising weight members 14 having pins 18 as before, but which pins extend through a pair of spaced apart plates 31 of a bracket on a roller type chain 32 which is endless and which trains around a drive pulley 33 and an idler pulley 34, being driven by a motor 7' through an appropriate drive mechanism. The roller chain travels on a track 35, being guided by the bracket plates 31 so that the weight members 14 conveyed thereby along one end of the series of rollers, in superposed relation thereto. The weight members have a friction producing member or surface 36 on their under surface, bearing against the rollers 3.

With this arrangement, the weight members are moved in a curved line, and each roller 3 will be driven by each weight member 14, although the rollers will not be driven continuously as in the embodiment of FIGS. 1–3. This provides a very simple arrangement for going around curves or corners, and is entirely satisfactory where a continuous, positive drive is not essential. Again, the weights span no more than two rollers, and each weight is at about a right angle to the roller axis as its center crosses said axis.

Accordingly, it is seen that my invention fully accomplishes its intended objects, and provides an extremely simple and relatively inexpensive live roller conveyor drive which is rugged and dependable in operation. While certain forms of my invention have been disclosed and described in detail, that is done by way of illustration only, and not by way of limitation.

Having fully disclosed and completely described my invention, together with its mode of operation, what I claim as new is:

1. A conveyor comprising, a supporting frame, a series of live rollers journaled on said frame, an endless drive member in frictional contact with the upper surfaces of said rollers adjacent one end thereof for rotating the same, and plural individual weight members superposed on said endless drive member and pressing the latter substantially radially against said rollers for increasing the frictional contact between said drive member and said rollers, said weight member being independently movable generally radially of said rollers.

2. A conveyor comprising, a supporting frame, a series of live rollers journaled on said frame, an endless drive member in frictional engagement with the upper surfaces of said rollers adjacent one end thereof for rotating the latter upon endwise movement of the former, and multiple individual weight members superposed on said endless drive member and imparting a generally radial force to said drive member increasing the frictional engagement of said drive member with said rollers, each of said weight members being of a dimension lengthwise of said drive member less than twice the centerline spacing of adjacent rollers, whereby each of said weight members can span only two of said rollers.

3. A conveyor as set forth in claim 2, together with means restraining said weight members against movement lengthwise of said drive member while enabling independent movement of said weight members generally radially of said rollers.

4. A conveyor comprising, a supporting frame, a series of rollers journaled on said frame, an endless drive member in frictional engagement with the upper surfaces of said rollers adjacent one end thereof for rotating the same, multiple individual weight members superposed on said drive member and urging the same generally radially against said rollers, each of said weight members spanning at most only two of said rollers, and means restraining said weight members against movement lengthwise of said drive member.

5. A conveyor as set forth in claim 4, wherein said restraining means comprise a flexible strap spanning said weight members and releasably connected thereto.

6. A conveyor as set forth in claim 4, wherein said restraining means also hold said weight members against lateral movement relative to said restraining means.

7. A conveyor comprising, a supporting frame, a series of rollers journaled on said frame, an endless drive member frictionally engaging the upper surfaces of said rollers adjacent one end thereof for rotating said rollers, plural individual weight members superposed on said drive member and urging the same generally radially against said rollers, each of said weight members spanning at most only two of said rollers, and means restraining said weight members against movement lengthwise of said drive member, said restraining means comprising a flexible strap spanning said weight members and having a series of openings therein, and pin means projecting from said weight members through said openings.

8. A conveyor comprising, a series of live rollers, an endless drive belt frictionally engaging the upper surfaces of said rollers adjacent one end thereof for rotating the same, multiple individual weight members superposed on said drive belt and urging the same generally radially against said rollers, means restraining said weight members against movement with said drive belt, and means providing a surface having a relatively low coefficient of friction between said drive belt and said weight members.

9. A conveyor as set forth in claim 8, wherein said last-named means comprise a part of said drive belt.

10. A conveyor comprising, a series of live rollers, a first part comprising multiple individual weight members in superposed relation to said rollers adjacent one end thereof, said weight members spanning at most only two of said rollers, a second part comprising means interposed between said weight members and said rollers and presenting a friction surface to the latter, said weight members pressing said second part radially against said rollers, and means for moving at least one of said parts lengthwise of said series of rollers for rotating the same.

11. A conveyor as set forth in claim 10, wherein said weight members are moved to rotate said rollers, and said friction means comprise friction members carried on the undersurfaces of said weight members.

12. A conveyor as set forth in claim 10, wherein both said parts move, said second part comprises an endless drive belt, and said weight members are carried thereby.

13. A conveyor as set forth in claim 10, wherein said second part moves and comprises an endless belt, and said weight members are restrained against movement therewith.

14. A conveyor as set forth in claim 13, together with hollow pneumatic backing means for said weight members.

15. A conveyor as set forth in claim 13, together with solid resilient backing means for said weight members.

16. A conveyor as set forth in claim 7, wherein said pin means comprise a pair of pins on each weight member.

References Cited in the file of this patent
UNITED STATES PATENTS

| | | |
|---|---|---|
| 1,919,837 | Gotthardt | July 25, 1933 |
| 1,967,747 | Eggleston | July 24, 1934 |
| 2,158,675 | Davis | May 16, 1939 |
| 2,566,021 | Fergnani | Aug. 28, 1951 |
| 2,646,769 | Lindsay | July 28, 1953 |
| 2,656,943 | Nilsson | Oct. 27, 1953 |
| 2,841,270 | Bombard | July 1, 1958 |

FOREIGN PATENTS

| | | |
|---|---|---|
| 791,998 | Great Britain | Mar. 19, 1958 |